United States Patent
Yasuda et al.

(10) Patent No.: US 7,801,434 B2
(45) Date of Patent: Sep. 21, 2010

(54) FOCUS CONTROLLER AND OPTICAL APPARATUS USING THE SAME

(75) Inventors: Hiromu Yasuda, Kawasaki (JP); Kousuke Kiyamura, Kawasaki (JP); Chikara Aoshima, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/357,727

(22) Filed: Jan. 22, 2009

(65) Prior Publication Data

US 2009/0190910 A1    Jul. 30, 2009

(30) Foreign Application Priority Data

Jan. 24, 2008    (JP)    ............... 2008-013326

(51) Int. Cl.
G03B 3/10      (2006.01)
G03B 13/34     (2006.01)
H04N 5/225     (2006.01)
H02P 6/04      (2006.01)
H02P 23/12     (2006.01)

(52) U.S. Cl. ................. 396/133; 348/220.1; 318/400.1; 318/400.14

(58) Field of Classification Search .................. 396/133
See application file for complete search history.

(56) References Cited

U.S. PATENT DOCUMENTS 7,546,030 B2    6/2009    Ito et al.

2006/0232698 A1    10/2006    Ito et al.

FOREIGN PATENT DOCUMENTS

| JP | 05-064056 | 3/1993 |
|---|---|---|
| JP | 05-150154 | 6/1993 |
| JP | 10-150798 | 6/1998 |
| KR | 10-0156128 A | 11/1998 |
| KR | 10-2006-109336 A | 10/2006 |

OTHER PUBLICATIONS

English Translation of JP 09-331666, Aoshima Tsutomu, Dec. 22, 1977, pp. 1-38.*
English Translation of JP 2004-109690, Sato Shigeki et al., Apr. 8, 2004, pp. 1-44.*

* cited by examiner

Primary Examiner—Melissa J Koval
(74) Attorney, Agent, or Firm—Cowan, Liebowitz & Latman, P.C.

(57) ABSTRACT

A focus controller configured to control focus of an optical element includes a focus state detector configured to detect a focus state based on a contrast value of an image formed by the optical element, and a driving mechanism that moves the optical element including a motor, a position sensor configured to detect a position of a rotor in the motor, and a driving controller configured to select, in accordance with the contrast value, first driving configured to switch an electrization to a coil in accordance with an output of the position senor, or second driving configured to switch the electrization to the coil in the motor in accordance with a determined time interval.

9 Claims, 10 Drawing Sheets

FOCUS CONTROLLER AND OPTICAL APPARATUS USING THE SAME

BACKGROUND OF THE INVENTION

1. Field of the Invention

The present invention relates to a focus controller and an optical apparatus using the same.

2. Description of the Related Art

Conventionally, Japanese Patent Laid-Open Nos. 05-150154 and 05-064056 disclose mountain climbing driving as an autofocus ("AF") for an optical apparatus, such as a video camera or a TV camera. The mountain climbing driving is a method that detects a definition of a photography screen from a high frequency component in a video signal obtained from an image pickup lens, and controls a position of a focus lens in an optical-axis direction so that the definition can become maximum. The conventional position control finely reciprocates (wobbles) the focus lens in the optical-axis direction at a constant period through an open loop control using a stepping motor.

However, the stepping motor loses synchronization between a control pulse and a motor's rotation in the high-speed rotation or with an excessively large load, (stepping out). In order to solve this problem, Japanese Patent Laid-Open No. 10-150798 proposes use of a blushless DC motor instead of the stepping motor. Since the blushless DC motor detects a rotor's position by using a sensor, it has an advantage in maintaining synchronization between the instruction signal and the rotor's position and in preventing stepping out.

Nevertheless, the open loop control using the blushless DC motor cannot control a lens's position, and has a problem in that the wobbling amplitude becomes inaccurate. A closed loop is needed for accurate positioning control with the blushless DC motor, but thereby causes a problem in which a circuit becomes complex.

BRIEF SUMMARY OF THE INVENTION

The present invention provides a focus controller and an optical system configured to prevent stepping out and to provide highly precise positioning with a comparatively simple configuration.

A focus controller according to one aspect of the present invention configured to control focus of an optical element includes a sensor configured to detect an image formed by the optical element and to output an image signal, a focus state detector configured to detect a focus state based on a contrast value of the image obtained from the image signal output from the sensor, and a driving mechanism configured to move one of the optical element and the sensor relative to the other in controlling the focus, wherein the driving mechanism includes a motor that includes a rotor having a magnet, and a stator having a coil configured to provide a rotational force to the magnet, a position sensor configured to detect a position of the rotor in the motor, and a driving controller configured to select, in accordance with the contrast value, first driving configured to switch an energization to the coil in accordance with an output of the position sensor, or second driving configured to switch the energization to the coil in the motor in accordance with a determined time interval.

Further features of the present invention will become apparent from the following description of exemplary embodiments with reference to the attached drawings.

DETAILED DESCRIPTION OF THE EMBODIMENTS

Referring now to the accompanying drawings, a description will be given of a focus controller according to the present invention and an optical apparatus using the same.

First Embodiment

Figure 1:
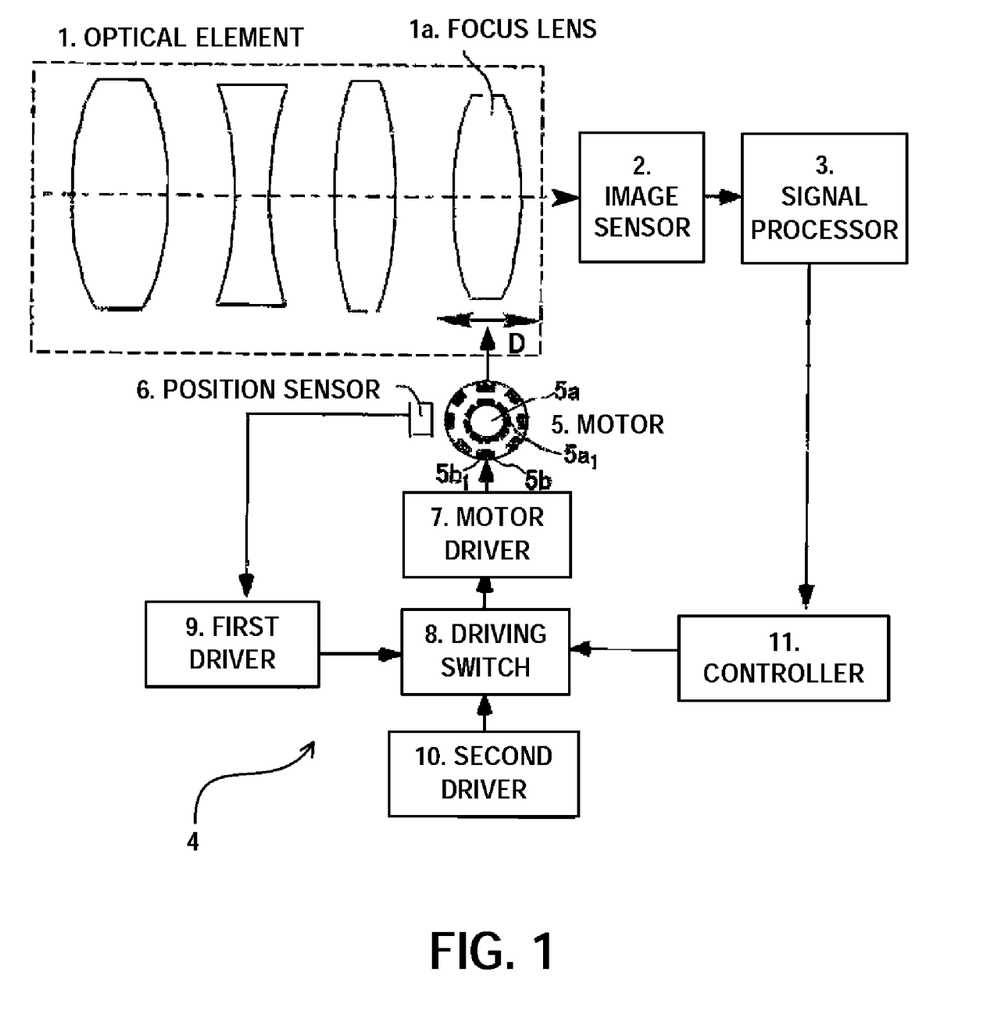
FIG. 1 is a block diagram of a digital camera (optical apparatus) according to a first embodiment.
Figure 2:
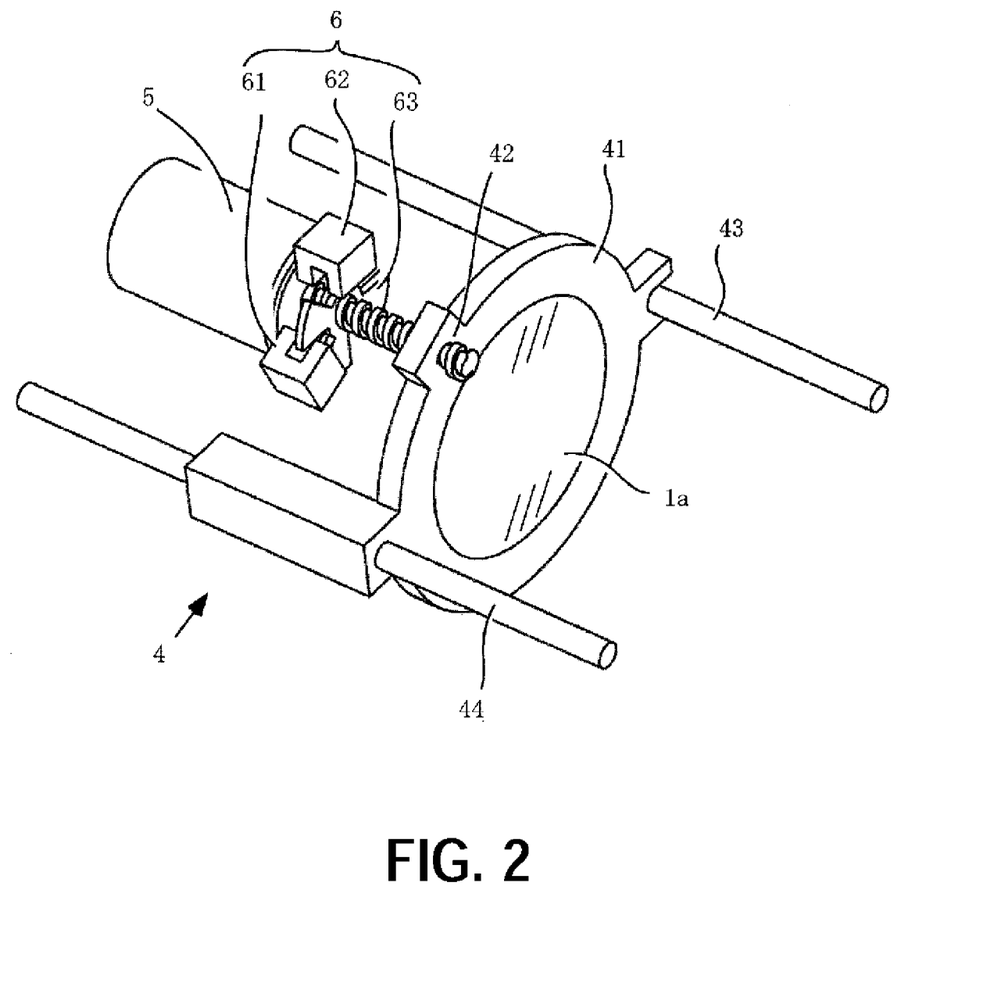
FIG. 2 is a perspective view of a driving mechanism shown in FIG. 1.

FIG. 1 is a block diagram of an optical apparatus 100 according to a first embodiment. FIG. 2 is a perspective view of a driving mechanism 4 for a focus controller in the optical apparatus 100. The optical apparatus 100 includes an optical element 1, and a focus controller of the optical element 1. The focus controller controls focus of the optical element 1, and includes a focus state detector and a driving mechanism 4.

The optical element 1 is a lens group or the like, and includes a focus lens (or lenses) 1a. An image magnification hardly changes even when the focus lens 1a finely reciprocates or wobbles in an optical-axis direction D, and only a focal length changes. Therefore, the focus of an image formed on an image sensor 2 can be controlled by moving the focus lens 1a in the optical-axis direction D.

The focus state detector detects a focus state based on a contrast value of an image formed by the optical element 1. The focus state detector includes the image sensor 2 and a signal processor 3. The image sensor 2 includes a photoelectric conversion element, such as a CCD or a C-MOS sensor, which converts light that has passed the optical element into an electric signal. The signal processor 3 detects a contrast value of a screen based on a signal that has been converted into an electric signal by the image sensor 2. Thereby, a focus state of the focus lens 1a can be recognized. The focus state detector obtains a contrast value of an image formed by the optical element 1 by detecting a high frequency component of an electric signal obtained by the image sensor 2, and detects the focus state based on the contrast value.

The driving mechanism 4 shown in FIG. 2 moves the focus lens 1a in the optical-axis direction. The driving mechanism 4 includes a motor 5, a position sensor 6, a motor driver, 7, a driving switch 8, a first driver 9, a second driver 10, and a controller 11 shown in FIG. 1. In FIG. 2, the focus lens 1a is held by a lens holder 41. The lens holder 41 is movably supported by a pair of guide bars 43 and 44 that are parallel to optical-axis direction, and symmetrically arranged with respect to the optical axis of the focus lens 1a. As a result, the focus lens 1a can move only in the optical-axis direction. The lens holder 41 is provided with a nut part 42, and engaged with a lead screw part provided in the motor 5. The focus lens 1a can be moved in the optical-axis direction by rotating the motor 5. The driving mechanism used for the focus controller is not limited to the structure shown in FIG. 2, and can use any known structure, such a cam and a pin, which can convert a motion of the motor in the rotational direction into a motion of the lens in the optical-axis direction.

While this embodiment controls the focus of the image formed on the image sensor 2 by moving the focus lens 1a in the optical-axis direction D, the driving mechanism may move one of the optical element 1 and the focus state detector relative to the other. In other words, the image sensor 2 may be moved in the optical-axis direction instead of the focus lens 1a. The focus of the image formed on the image sensor 2 by the optical element 1 can be controlled by changing a relative position between the focus lens 1a and the image sensor 2 in the optical-axis direction.

The motor 5 is a two-phase stepping motor with two coils, i.e., A phase and B phase, and can be rotated by one step corresponding to a predetermined angle by sequentially switching the energization direction to the coil. More specifically, the motor 5 has a rotor 5a having a magnet $5a_1$ and a stator 5b having a coil $5b_1$ configured to provide a rotational force to the magnet $5a_1$.

The position sensor 6 includes, as shown in FIG. 2, photo-interrupters 61 and 62, and a turntable 63 having slits that are periodically provided in the rotating direction, and the position sensor 6 outputs an electric signal in accordance with a rotating position of the rotor 5a in the motor 5. The photo-interrupters 61 and 62 are arranged apart from each other by a phase difference so as to output signals that shift by an electric angle of 90°. Thereby, a rotating direction of the turntable can be recognized. A description of the detailed locations of the photo-interrupters 61 and 62 will be described later. The position sensor 6 may use a Hall element or an MR device, and may read a magnetic flux of the magnet attached to the rotor in the motor.

The motor driver 7 electrifies the motor 5, and enables the current in a predetermined direction to flow in each coil of the motor 5. The driving switch 8 drives the motor 5 through a first driver 9 or a second driver 10 in accordance with an instruction from the controller 11.

The first driver 9 drives the motor 5 through feedback energization switching mode. The feedback energization switching mode is a mode that switches the energization to the coil $5b_1$ in the motor 5 in accordance with a pulsed signal from the position sensor 6, and is the same driving method as the blushless DC motor. The feedback energization switching mode is used to move the focus lens 1a in the constant direction (for example, toward the in-focus point) at a high speed (first speed).

The second driver 10 drives the motor 5 through the step mode. The step mode is a mode that switches the energization to the coil $5b_1$ in the motor 5 in accordance with a determined time interval, and is the same driving method as the stepping motor. The step mode is used to reciprocate (wobble) the focus lens 1a in the optical-axis direction D at a low speed (which is a second speed smaller than the first speed) at a constant period.

The controller 11 sends a switching signal to the driving switch 8 in accordance with a contrast value obtained by the signal processor 3. A description will be given later of a more specific switching signal generation method.

The driving switch 8 and the controller 11 constitute a driving controller. In accordance with the contrast value, the driving controller switches the energization to the coil in the motor 5 between the first driver 9 and the second driver 10.

Next follows a description of the feedback energization switching mode and the step mode as an operational mode of the motor 5.

Figure 3:
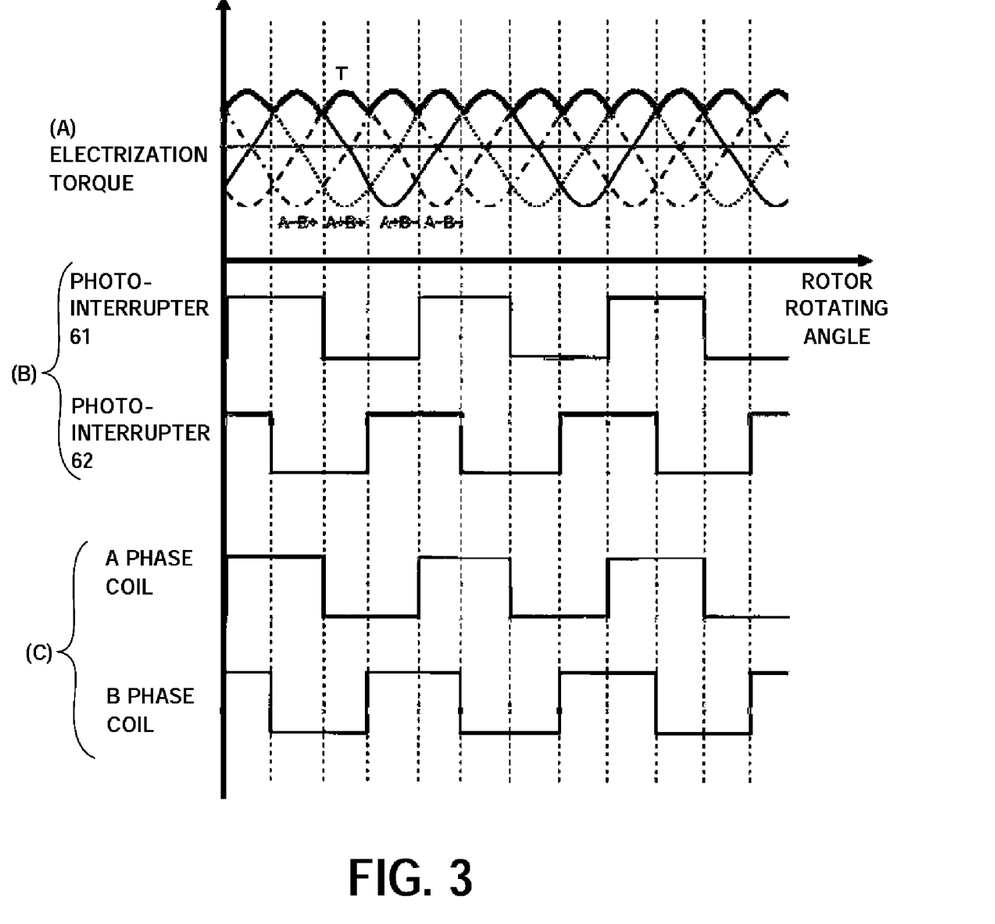
FIGS. 3A-3C are graphs showing the driving principle of the motor shown in FIG. 1 as a blushless DC motor.

The feedback energization switching mode is a method that switches the direction to the motor 5 in accordance with the signal of the position sensor 6. Referring to FIG. 3, a description will be given of detailed locations of the photo-interceptors 61 and 62.

FIG. 3A shows a torque applied to the rotor 5a when a constant current flows in the coil. When the motor 5 has two-phases coils $5b_1$, positive and reverse currents can flow in the two coils $5b_1$, whereby four types of torque distributions A−B−, A+B−, A+B+, and A−B+ are formed, as illustrated. They have the same waveform having almost the same sinusoidal shape, and have a phase difference of an electric angle of 90°.

FIG. 3B shows output signals of the photo-interrupters 61 and 62. The photo-interrupter 61 is arranged so that outputs change at nodes of the torques A+B− and A−B− and at nodes of the torques A+B+and A−B+. The photo-interrupter 62 is arranged so that outputs change at nodes of the torques A+B+ and A+B− and at nodes of the torques A−B+ and A−B−.

FIG. 3C shows the energization to the A phase coil and the energization to the B coil. The feedback energization switching mode switches the energization to the A phase coil when the output of the photo-interrupter 61 changes, and the energization to the B phase coil when the output of the photo-interrupter 62 changes. Thereby, the motor 5 can provide suitable energizations corresponding to rotational angles of the rotor 5a as shown by T in FIG. 3A. Since the feedback energization switching mode confirms that the motor 5 is rotated by one step and then switches to the next energization, the synchronization between the driving pulse and the motor's rotation is maintained and stepping out is unlikely to occur in principle. On the other hand, since a time period corresponding to one step rotation of the motor 5 fluctuates depending upon a load applied to the motor, a motor's speed cannot be determined in the feedback energization switching mode.

The step mode is a method that changes to the next energization step after a predetermined time period has passed irrespective of the rotation state of the motor 5. The motor 5 rotates by every predetermined angle by switching between the energization direction to the A phase coil and the energization direction to the B phase. Therefore, the open loop control can easily rotate the motor to a target position. However, switching to the next energization without detecting the rotating state of the motor may cause stepping out.

Figure 4:
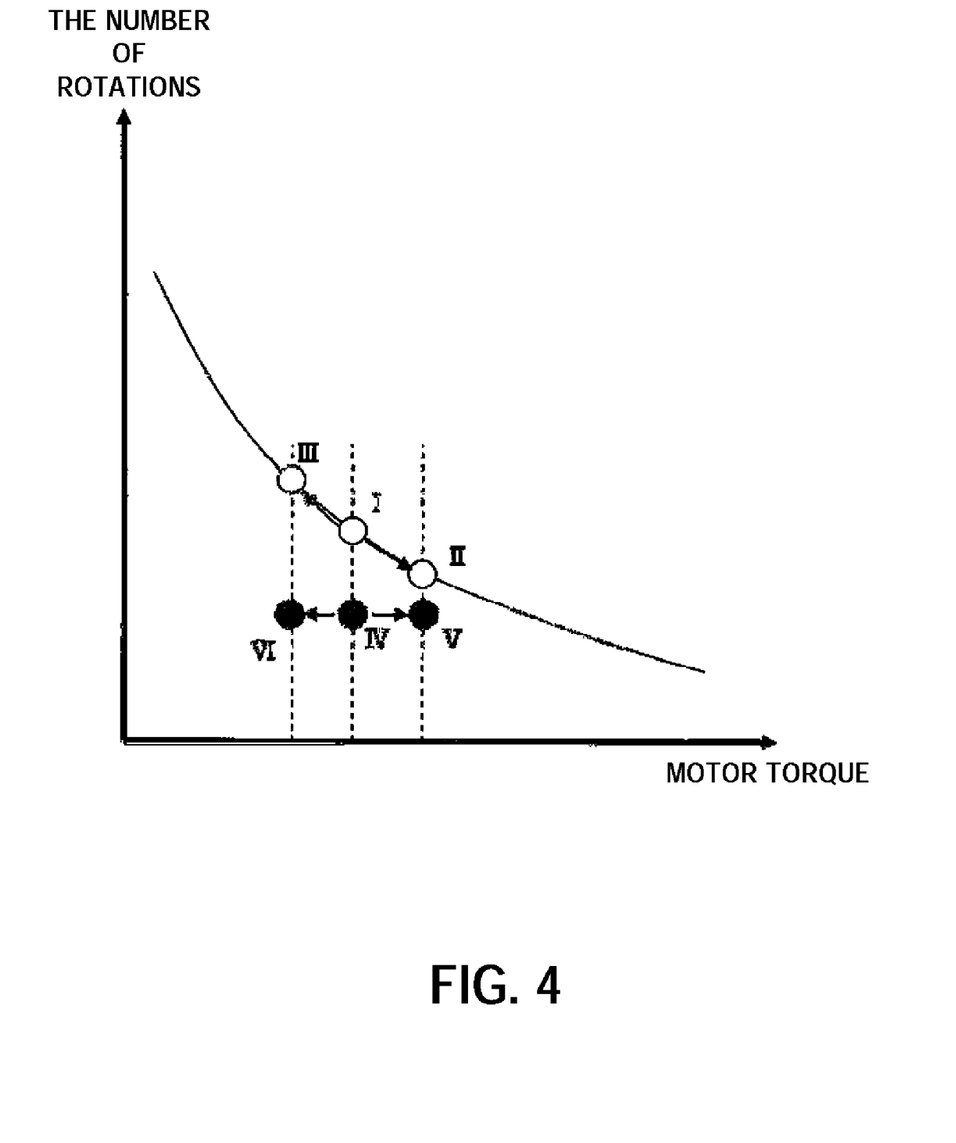
FIG. 4 is a graph showing a relationship between a torque generated by the motor shown in FIG. 1 and the number of rotations.

FIG. 4 is a graph showing a relationship between a torque generated by the motor and the number of rotations. The abscissa axis denotes a torque generated by the motor 5, and the ordinate axis denotes the corresponding number of rotations of the motor 5. In the feedback energization switching mode, the motor 5 always operates on this line. For example, assume that the motor 5 is driven at an operation point I in FIG. 4. When the load fluctuates in the motor 5, the motor 5 does not step out; as the load increases the number of rotations reduces as shown by II in FIG. 4, and as the load reduces the number of rotations increases as shown by III in FIG. 4. On the other hand, in the step mode, this curve indicates a limit of stepping out. When the driving pulse higher than this curve is input, a rotation of the motor 5 cannot follow switching of the energization and the motor 5 will step out. In order to avoid this problem, the motor is used at a low-speed side so as to maintain latitude to this curve (as shown by IV in FIG. 4). Thereby, the motor can be rotated at a constant speed irrespective of the fluctuation of the load. On the contrary, the speed of the motor 5 becomes about half the speed of the feedback energization switching mode (as shown by IV, V, and VI in FIG. 4). Thus, the feedback energization switching mode can rotate the motor at a higher speed than the step mode, and the step mode can provide precise speed and positioning controls. Therefore, an attempt to move the lens by a long stroke at a high speed uses the feedback energization switching mode that facilitates the high speed driving, and an attempt to precisely move the lens by a short stroke uses the step mode. Thereby, highly precise positioning is maintained without stepping out in focusing.

Figure 5:
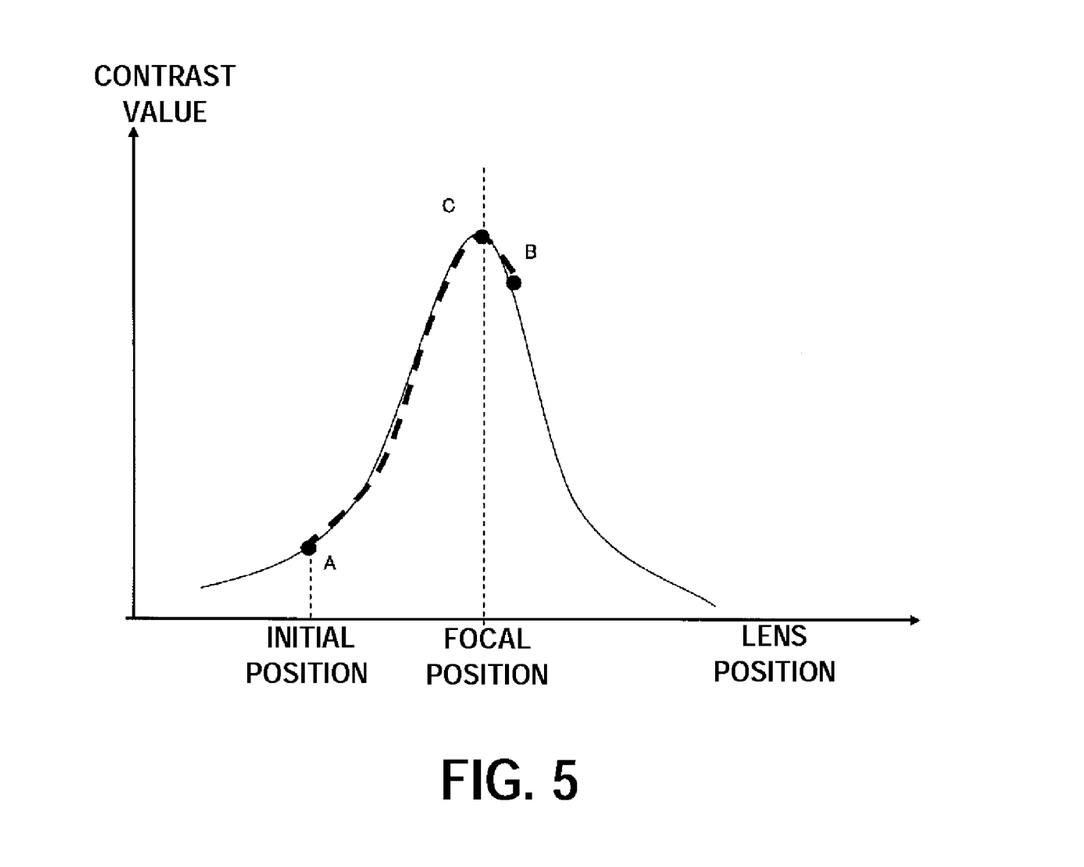
FIG. 5 is a graph for explaining a driving method according to the first embodiment.
Figure 6:
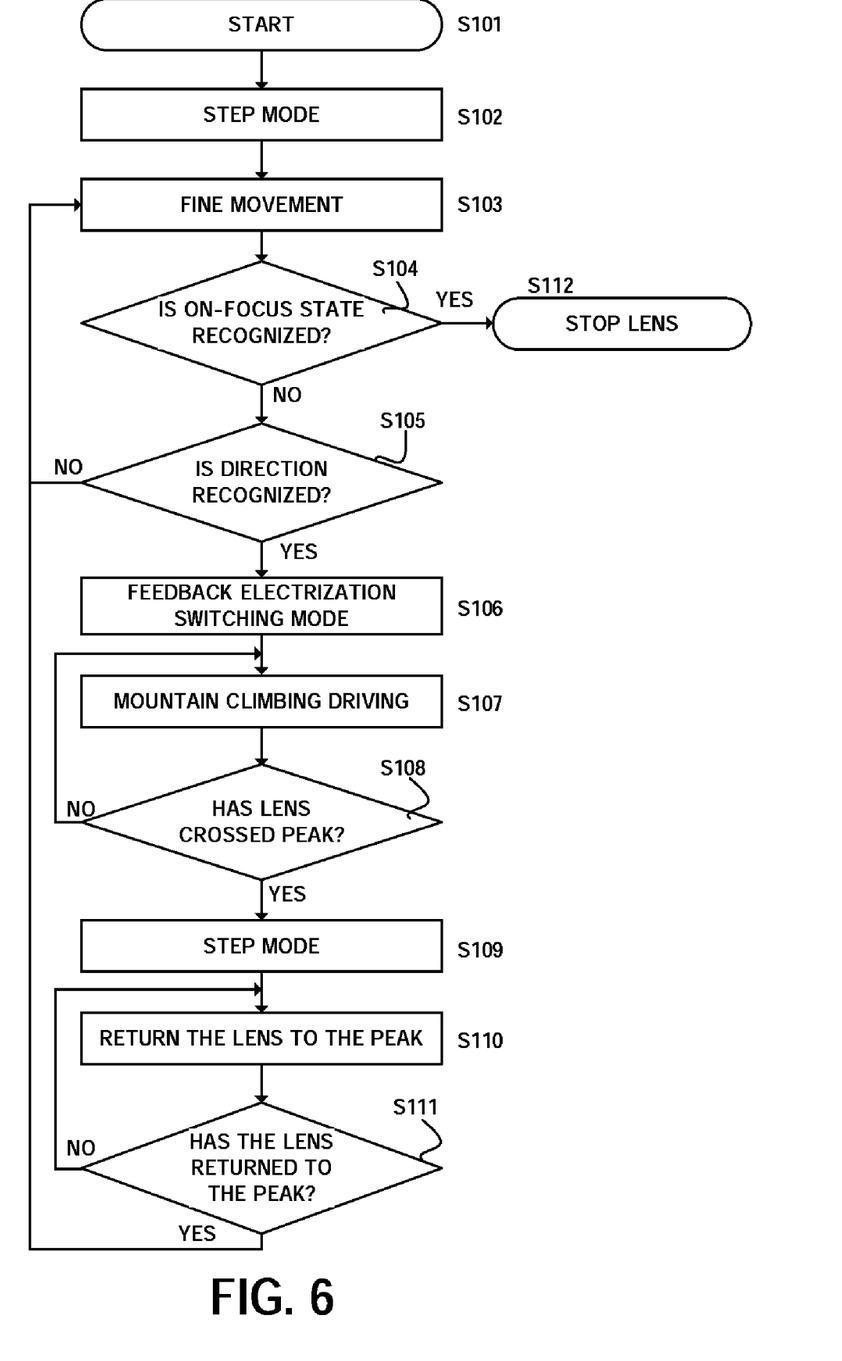
FIG. 6 is a flowchart for explaining a driving method according to the first embodiment.

Referring now to FIGS. 5 and 6, a description will be given of a switching method of the first and second drivers 9 and 10. FIG. 5 is a graph for explaining a driving method of this embodiment, and the abscissa axis denotes a moving distance of the focus lens 1a, and the ordinate axis denotes the contrast value of the subject. FIG. 6 is a flowchart showing the driving method of the controller 11.

Initially, assume that the focus lens 1a is located at an A point shown in FIG. 5. After driving starts (step 101), the controller 11 selects the step mode (step 102) and finely reciprocates (wobbles) the focus lens 1a along the optical axis (step 103). The step mode can precisely set the wobbling amplitude. Next, the controller 11 determines whether it can recognize the in-focus state (step 104), and if so the controller 11 stops the focus lens 1a (step 112). When the controller 11 determines that it cannot recognize the in-focus state (step 104), the controller 11 checks a direction in which a signal of the contrast value increases (step 105). When the controller 11 cannot recognize the direction (step 105), the flow returns to the step 103.

In order to set the wobbling amplitude equal to or smaller than one step of the motor, one or two-phase driving that switches the energization to the coil $5b_1$ of the motor 5 for each phase or the micro step driving that gradually changes a ratio of the current to each coil $5b_1$ is performed. Thereby, the amplitude of the motor 5 can be made equal to or smaller than one step, and the motor can be reciprocated with small amplitude that is not available in the feedback energization switching mode.

When the controller 11 can recognize the direction (step 105), the controller 11 selects the feedback energization switching mode (step 106) and mountain-climbs the focus lens 1a in that direction (step 107). The feedback energization switching mode can avoid stepping out of the motor 5 at the high-speed operation time. The contrast value increases from A to C in FIG. 5. The maximum value C of the contrast value is an in-focus point of the focus lens 1a. When the contrast value decreases down to the B point, the controller 11 determines that the lens has crossed the in-focus point (step 108), and switches the operational mode of the motor 5 to the step mode (step 109). Then, the controller 11 inverts the moving direction, and moves the focus lens 1a to the in-focus point (steps 110 and 111). After the step 111, the flow moves to the step 103. Thereby, when the lens returns to the C point that is the maximum value of the contrast value, the controller 11 wobbles the lens again and determines whether it can recognize the in-focus state (step 104). When the focus lens 1a reaches the in-focus point, the controller 11 turns off the motor 5 (step 112). After the in-focus state is obtained, the focus lens 1a may be reciprocated on the optical axis. Thereby, a shift of the focus lens 1a from the in-focus point is detected, and in that case the above operation is repeated.

This embodiment uses two motor driving modes, i.e., the feedback energization switching mode and the step mode. Since the motor does not step out even when it is driven at a high speed in the feedback energization switching mode, a speed of the motor can be increased so as to shorten a time period necessary to obtain the on-focus state. In addition, the torque is smaller than that of the step mode, and thus the feedback energization switching mode can use a smaller motor for driving and promote a miniaturization of the whole apparatus. On the other hand, the step mode can easily determine a speed and a position through the open loop control. In addition, one or two-phase energization driving or micro step driving can provide a motor position with higher resolution than that of the feedback energization switching mode. Thus, a switch between the feedback switching mode and the step mode can provide precise positioning without stepping out of the motor in the focusing operation, shortening the focusing time period.

Second Embodiment

Figure 7:
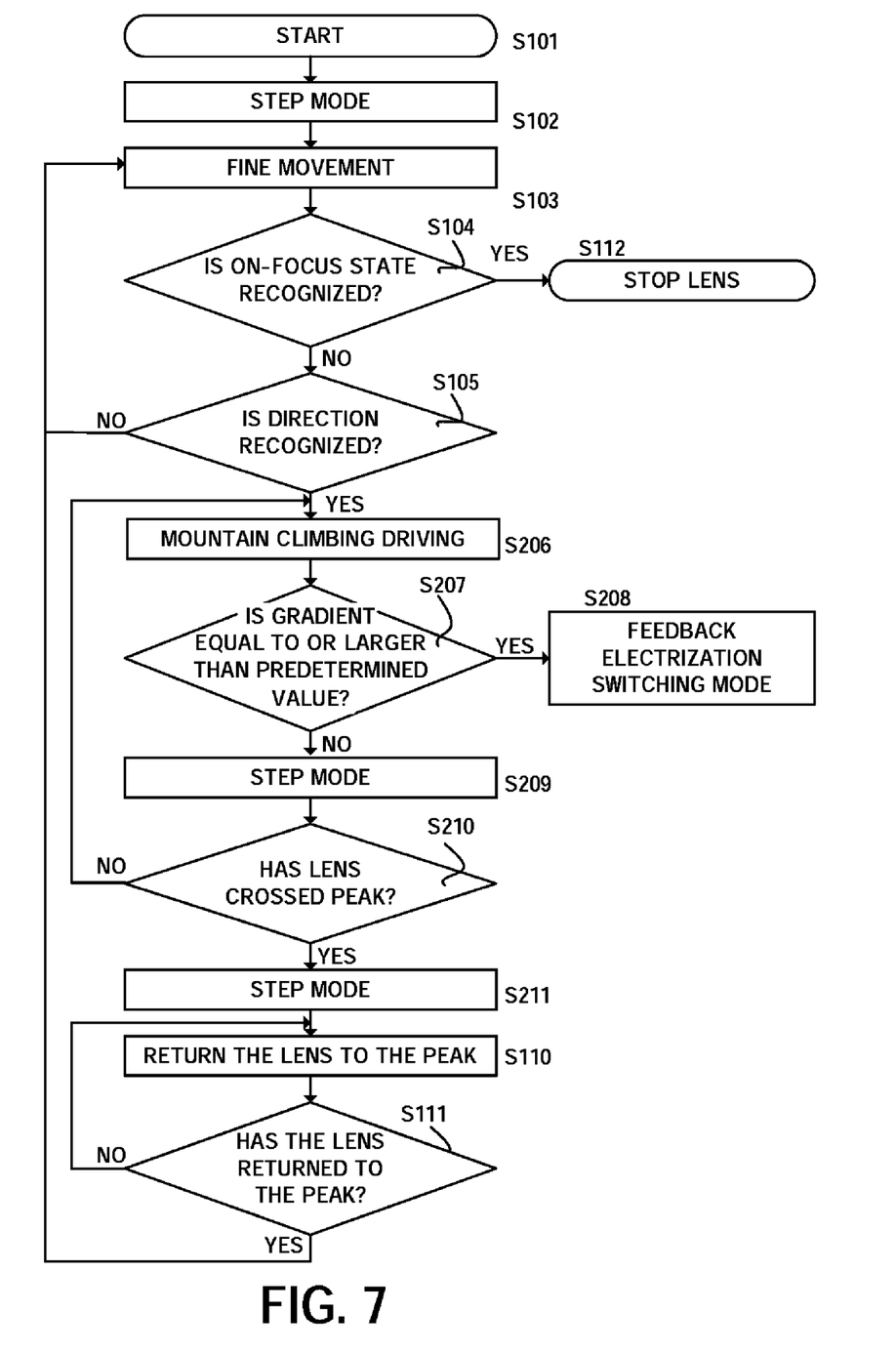
FIG. 7 is a flowchart for explaining a driving method according to a second embodiment.

Referring now to FIG. 7, a description will be given of a driving method according to a second embodiment of the present invention. Those elements in FIG. 7, which are the same as corresponding elements in FIG. 6, will be designated by the same reference numerals, and a description thereof will be omitted. The first embodiment selects the step mode for wobbling driving, and the feedback energization switching mode for other driving. On the other time, the second embodiment selects the feedback energization switching mode or the step mode in accordance with a value of a change rate of the contrast value.

In driving the focus lens 1a, the focus lens 1a is wobbled in the step mode similar to the first embodiment so as to find the direction in which the contrast value increases. Therefore, the flow from the step 101 to the step 105 (including the step 104 to the step 112) is similar to that shown in FIG. 6. Once the direction from the current position to the in-focus point is determined (step 105), the controller 11 mountain-climbs the focus lens 1a in that direction (step 206). At this time, the controller 11 obtains a change amount of the contrast value for each predetermined time period, divides the value by the moving distance, and obtains a gradient of the contrast value to the lens position. When determining that the value is equal to or larger than a threshold (step 207), the controller 11 switches from the step mode to the feedback energization switching mode (step 208), and when determining that the value is smaller than the threshold, the controller 11 selects or maintains the step mode (step 209).

Figure 10:
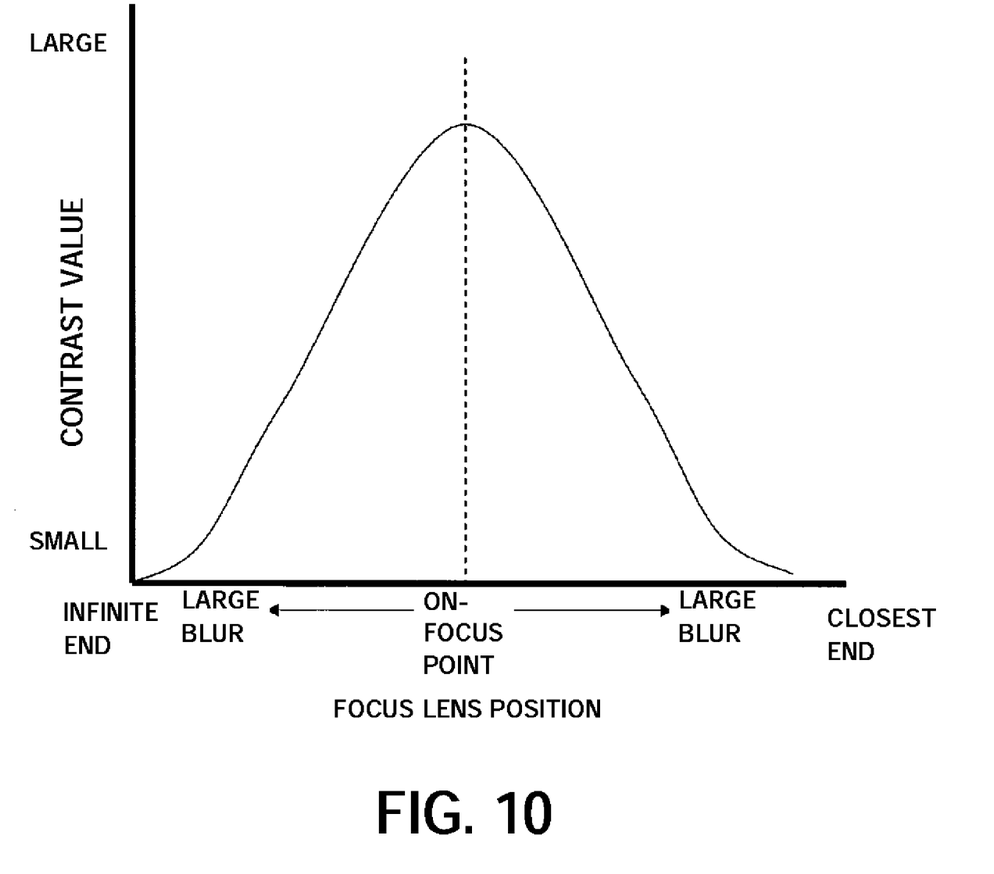
FIG. 10 is a graph showing a relationship between a position of a focus lens and a contrast value in the mountain climbing driving.

According to the relationship shown in FIG. 10 between the contrast value and the lens position, a gradient tends to reduce near the in-focus point. Therefore, when the gradient is equal to or larger than the threshold, it can be determined that the lens position is distant from the in-focus point. At this time, the feedback energization switching mode which facilitates high-speed driving is effective. When the gradient is smaller than the threshold, it can be determined that the in-focus position is close. Then, the driving mode is switched to the step mode that can facilitate the position control.

When detecting the peak (step 210), the controller 11 selects the step mode (step 211). In addition, this selection of the operational mode when having a hysteresis characteristic is also effective to antihunting of the focus lens 1a. In addition, when the load fluctuation to the motor 5 is sufficiently small and a speed of the motor 5 little changes, the determination criteria of the operational mode switching can use whether a time change amount of the contrast value is larger than a predetermined value instead of the gradient of the contrast value to the lens position. The load applied to the calculation can lessen because it is unnecessary to divide the change amount of the contrast value by the moving distance.

The second embodiment provides an effect of shortening the focusing time period in addition to the effect of the first embodiment. In other words, the first embodiment switches from the feedback energization switching mode to the step mode when the contrast value of the screen once exceeds the peak, and thus it is likely to take a long time to obtain the in-focus state when the lens goes past the in-focus point far. On the other hand, this embodiment can reduce going of the lens too far from the in-focus point. When the contrast value of the screen approaches to the peak as the point, a change amount of the contrast value becomes small. Since the feedback energization switching mode can be switched to the step mode when the change amount of the contrast value becomes small, the deceleration starts in front of the in-focus point and effectively shortens the focusing time period.

Third Embodiment

Figure 8:
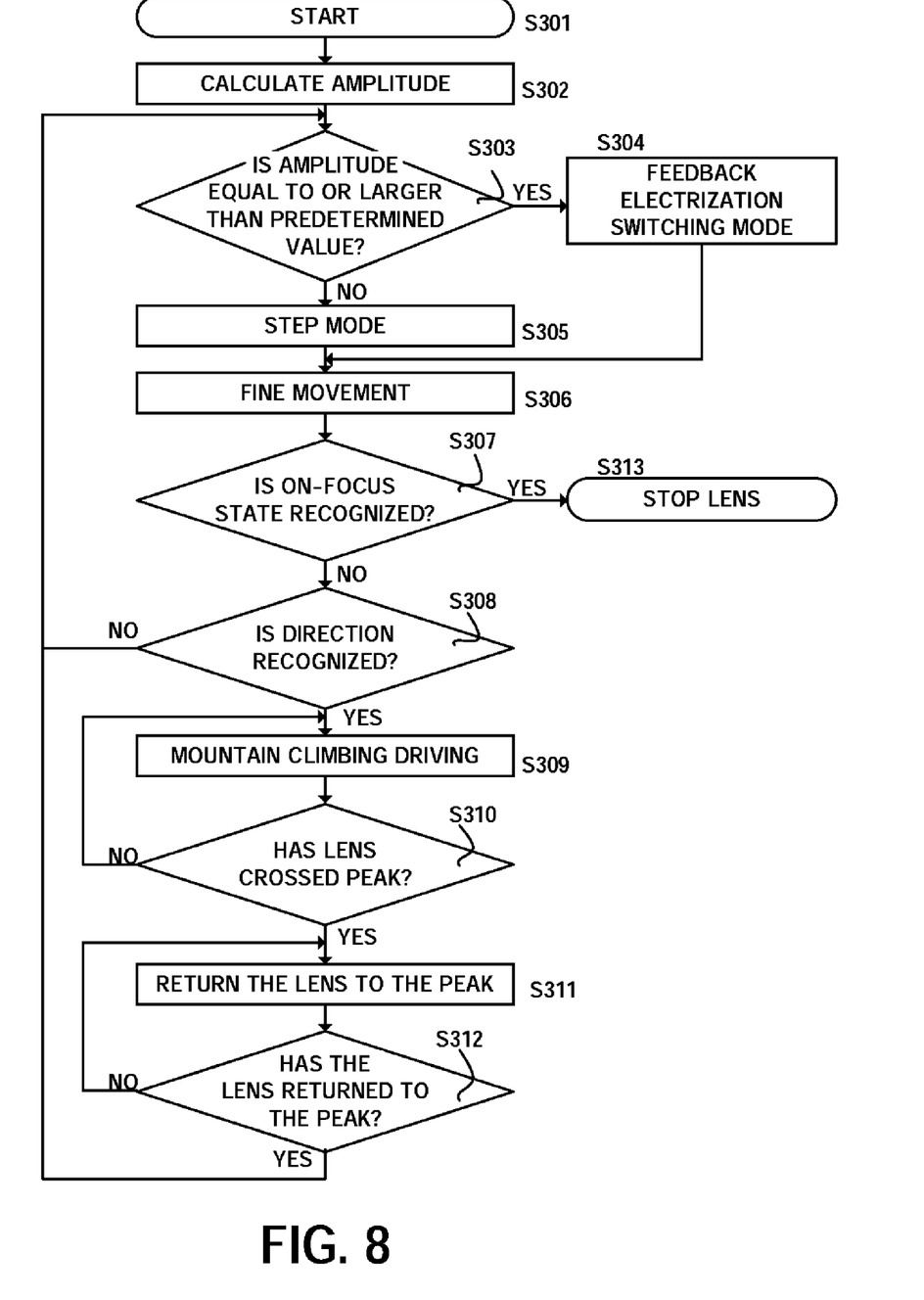
FIG. 8 is a flowchart for explaining a driving method according to a third embodiment.

Referring now to FIG. 8, a description will be given of a driving method according to a third embodiment of the present invention. In accordance with the wobbling amplitude, this embodiment switches between the feedback energization switching mode and the step mode. When the focus lens 1a wobbles, the formed image shifts from the focal point and the wobbling amplitude needs to fall within an image-change detectable range but be as small as an inconspicuous amount to the eyes. This value relates to a depth of field ("DOF") of the optical element 1. When the DOF is shallow, a change of the image becomes conspicuous unless a moving amount of the focus lens 1a is restrained small. On the other hand, when the DOF is deep, a change of the image cannot be detected unless the moving amount of the focus lens 1a is made large.

After driving starts (step 301), the wobbling amplitude is calculated (step 302). The DOF closely depends upon a focal length of the optical element 1 and an F value of the stop, and a ratio between the deepest DOF and the shallowest DOF is about dozens of times. Therefore, the wobbling amplitude calculated in the step 302 also becomes a difference of dozens of times between the minimum value and the maximum value.

When the moving amount of the motor 5 is small, the step mode is advantageous because it has good controllability. When the moving amount of the motor 5 is large, the motor 5 can be driven at a high speed by using the feedback energization switching mode. When the amplitude is equal to or larger than a predetermined value in accordance with the wobbling amplitude determined by the DOF of the focus lens 1a (step 303), the feedback energization switching mode is used for driving (step 304). On the other hand, when the amplitude is smaller than the predetermined value (step 303), the step mode is used for driving (step 305). Thereby, the wobbling becomes faster (step 306).

Thereafter, the controller 11 determines whether it can recognize the in-focus state (step 307), and if so stops the focus lens 1a (step 313). When determining that the controller 11 cannot recognize the in-focus state (step 307), the controller 11 checks the direction in which the signal for detecting the contrast value increases (step 308). When the controller 11 cannot recognize the direction (step 308), the flow returns to the step 303.

When the controller 11 can recognize the direction (step 308), the controller 11 mountain-climbs the focus lens 1a in that direction (step 309). Next, the controller 11 determines that the lens passes the in-focus point based on whether the contrast value crosses the peak (step 310), inverts the moving direction, and moves the focus lens 1a to the in-focus point (steps 311 and 312). After the step 312, the flow moves to the step 303 or 306.

This embodiment does not limit a driving mode in the mountain climbing driving after wobbling ends (step 309). The lens may be always moved by the step mode, or the step mode and the feedback energization switching mode may be switched under some conditions as in the other embodiment.

Fourth Embodiment

Figure 9:
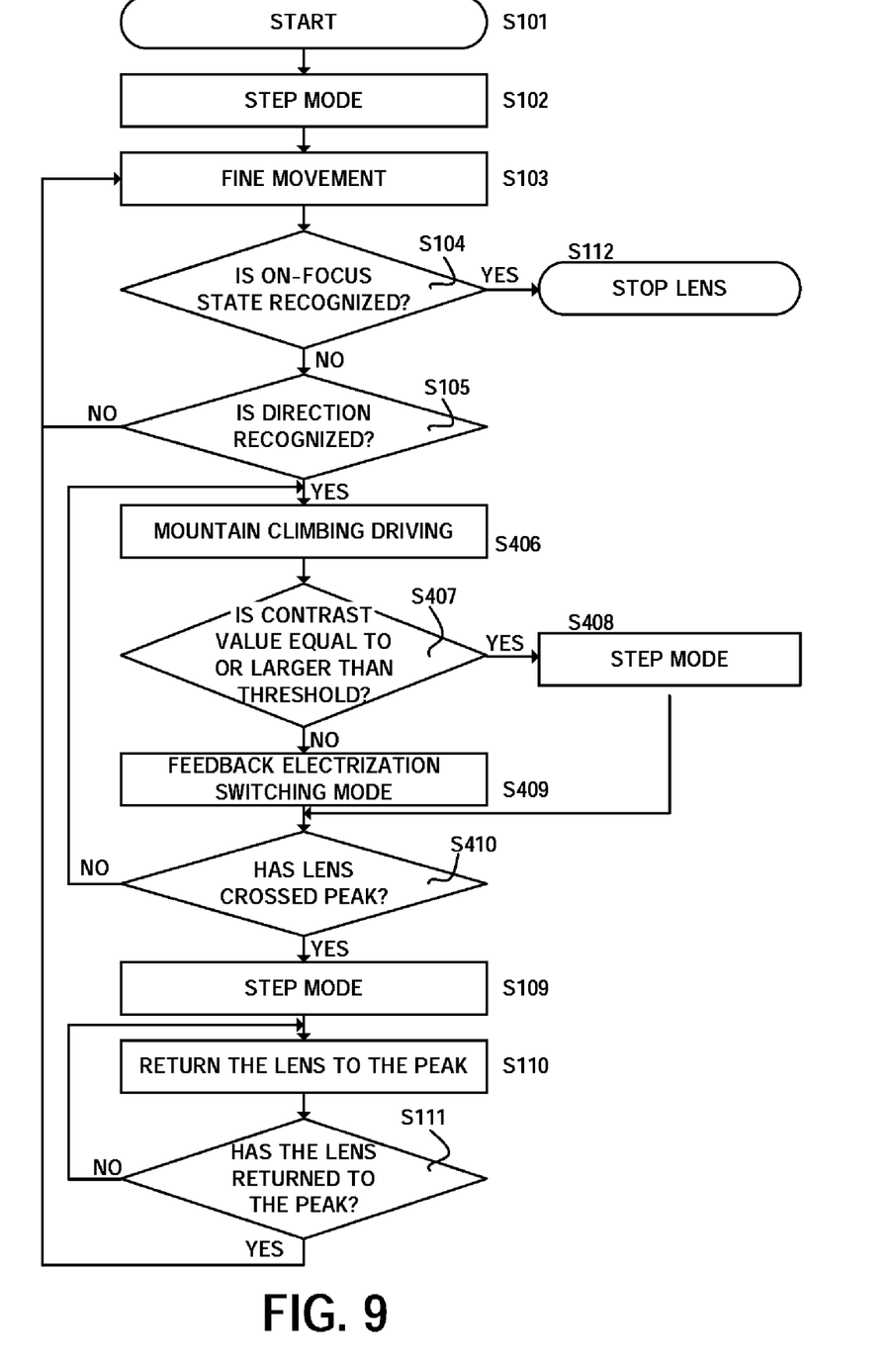
FIG. 9 is a flowchart for explaining a driving method according to a fourth embodiment.

Referring now to FIG. 9, a description will be given of a driving method according to a fourth embodiment of the present invention. Those elements in FIG. 9, which are the same as corresponding elements in FIG. 6, will be designated by the same reference numerals, and a description thereof will be omitted. In accordance with an absolute value of the contrast value in the mountain climbing driving, this embodiment switches between the feedback energization switching mode and the step mode.

In driving the focus lens 1a, the focus lens 1a is wobbled in the step mode similar to the first embodiment so as to find a direction in which the contrast value increases. Therefore, the flow from the step 101 to the step 105 (including the step 104 to the step 112) is similar to that shown in FIG. 6. When the direction from the current position to the on-focus point is determined (step 105), the controller 11 mountain-climbs the focus lens 1a in that direction (step 406). When determining that the contrast value is equal to or larger than a predetermined value (step 407), the controller 11 maintains the step mode (step 408). In addition, when determining that the contrast value is smaller than the predetermined value (step 407), the controller 11 switches the step mode to the feedback energization switching mode (step 409).

As shown in FIG. 10, the distant the focus lens 1a is from the in-focus position, the lower the contrast value is. As the focus lens 1 approaches to the in-focus position, the contrast value becomes higher. Therefore, when the contrast value is smaller than the threshold, it is advantageous to set a large moving amount for the focus lens 1a and to use the feedback energization switching mode. When the contrast value exceeds the threshold, the lens needs to start decelerating in the step mode.

Next, the controller 11 determines that the lens has passed the in-focus point based on whether contrast value has crossed the peak (step 410), and the controller 11 selects the step mode (step 109). The flow after the step 109 is similar to that of the first embodiment.

Since this embodiment detects that the lens approaches to the in-focus point before the lens crosses the peak, selects the step mode, and starts decelerating, this embodiment can reduce an amount by which the lens goes too far from the on-focus point.

The absolute value of the contrast value closely depends upon the subject and the DOF of the focus lens 1a. Therefore, the threshold closely depends upon the subject and the lens's DOF. More specifically, the threshold is varied based on at least one of the focal length of the focus lens 1a, the stop amount, and the brightness of the subject. The threshold at that time can vary within a range between 50% and 90% of the contrast value at the in-focus position. In addition, the anti-hunting effect of the motor 5 can also be maintained at this time by providing the switch between the modes, with the hysteresis characteristic.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-013326, filed on Jan. 24, 2008, which is hereby incorporated by reference herein in its entirety.

What is claimed is:

1. A focus controller configured to control focus of an optical element, said focus controller comprising:
    a sensor configured to detect an image formed by the optical element and to output an image signal;
    a focus state detector configured to detect a focus state based on a contrast value of the image obtained from the image signal output from the sensor; and
    a driving mechanism configured to move the optical element or the sensor relative to the other in controlling the focus,
    wherein the driving mechanism includes:
    a motor that includes a rotor having a magnet, and a stator having a coil configured to provide a rotational force to the magnet;
    a position sensor configured to detect a position of the rotor in the motor; and
    a driving controller configured to select a first driving operation in a case of a feedback energization switching mode or a second driving operation in a case of a step mode, said first driving operation being configured to switch an energization state of the coil in accordance with an output of the position sensor, said second driving operation being configured to switch the energization state of the coil in accordance with a determined time interval, said feedback energization switching mode being configured to move the optical element in a predetermined direction at a first speed while detecting the focus state using the focus state detector, and said step mode being configured to reciprocate the optical element at a predetermined period at a second speed smaller than the first speed in an optical-axis direction while detecting the focus state.

2. The focus controller according to claim 1, wherein the driving controller is configured to switch from the step mode to the feedback energization switching mode to move the optical element toward an in-focus point when no in-focus state is obtained in a range of a reciprocation in the step mode, and
    wherein the driving controller is configured to switch from the feedback energization switching mode to the step mode to move the optical element to the in-focus point when detecting a peak of the contrast value as the in-focus point.

3. The focus controller according to claim 1, wherein the driving controller is configured to move the optical element toward an in-focus point when no in-focus state is obtained in a range of a reciprocation in the step mode,
    wherein the driving controller is configured to switch from the step mode to the feedback energization switching mode to move the optical element to the in-focus point when a gradient of the contrast value to a position of the optical element is equal to or greater than a threshold,
    wherein the driving controller is configured to select the step mode to move the optical element to the in-focus point when the gradient is smaller than the threshold, and
    wherein the driving controller is configured to select the step mode to move the optical element to the in-focus point when detecting a peak of the contrast value as the in-focus point.

4. The focus controller according to claim 1, wherein the driving controller is configured to move the optical element toward an in-focus point when no in-focus state is obtained in a range of a reciprocation in the step mode,
    wherein the driving controller is configured to switch from the step mode to the feedback energization switching mode to move the optical element to the in-focus point when a time change amount of the contrast value to a position of the optical element is equal to or greater than a threshold,
    wherein the driving controller is configured to select the step mode to move the optical element to the in-focus point when the time change amount of the contrast value is smaller than the threshold, and
    wherein the driving controller is configured to select the step mode to move the optical element to the in-focus point when detecting a peak of the contrast value as the in-focus point.

5. The focus controller according to claim 1, wherein the driver controller is configured to select the feedback energization switching mode when amplitude of a reciprocation of the optical element is equal to or greater than a threshold, and to select the step mode when the amplitude of the reciprocation of the optical element is smaller than the threshold.

6. The focus controller according to claim 1, wherein the driver controller is configured to select the step mode when the contrast value is equal to or greater than a threshold, and to select the feedback energization switching mode when the contrast value is smaller than the threshold.

7. The focus controller according to claim 6, wherein the driver controller is configured to vary the threshold based on at least one of a focal length of the optical element, a stop value, and brightness of a subject.

8. The focus controller according to claim 6, wherein the threshold is varied within a range between 50% and 90% of the contrast value at an in-focus point.

9. An optical apparatus comprising:
    an optical element; and
    a focus controller according to claim 1 configured to control focus of the optical element.

* * * * *